UNITED STATES PATENT OFFICE.

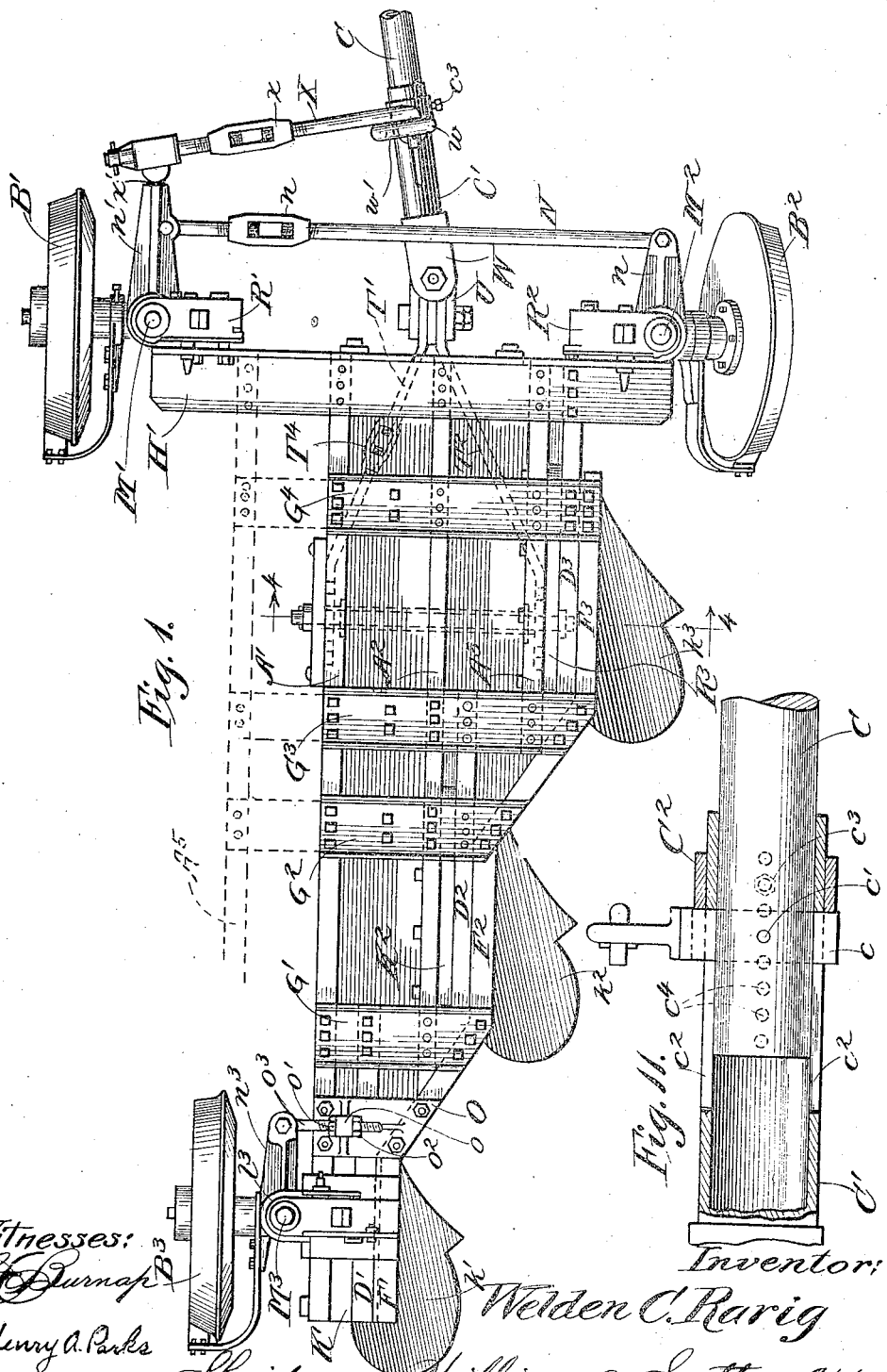

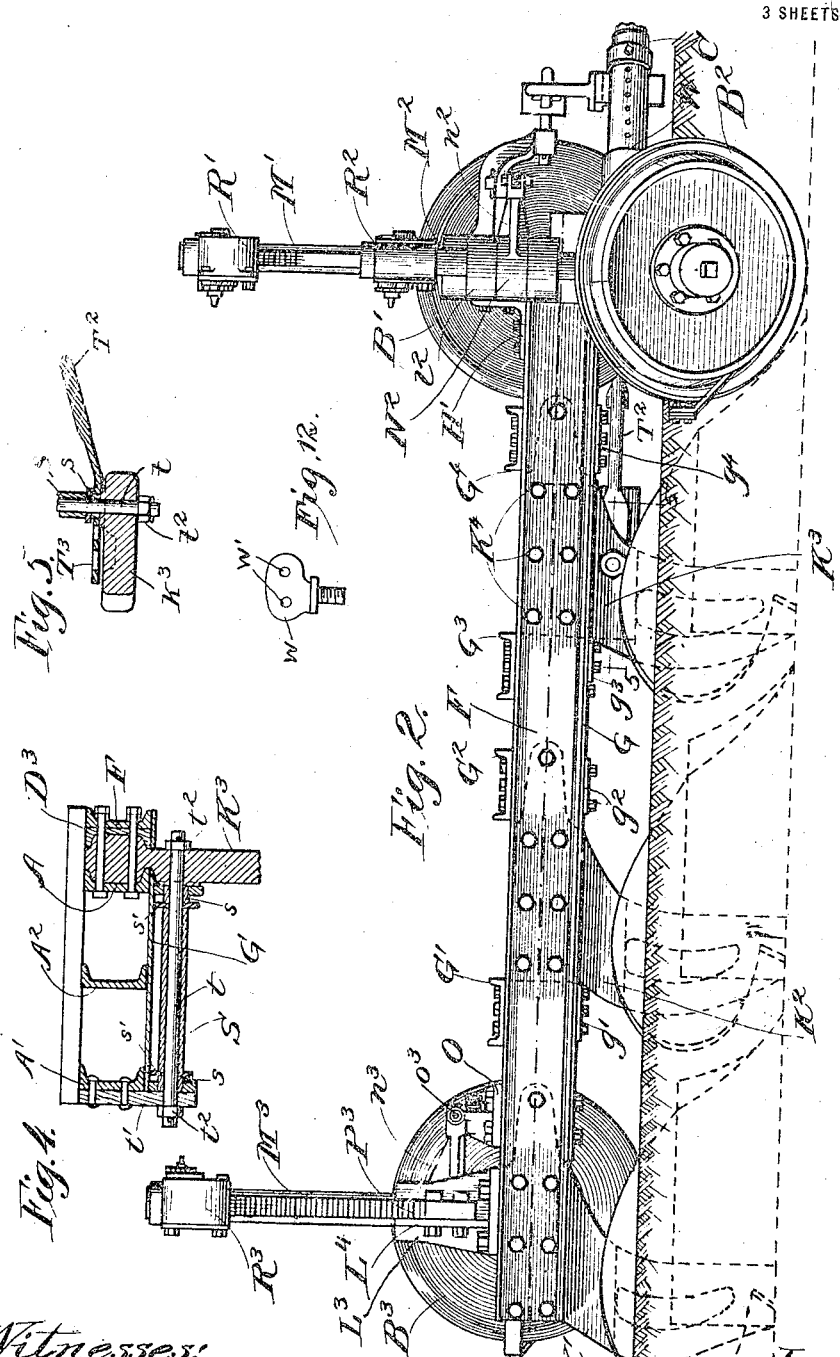

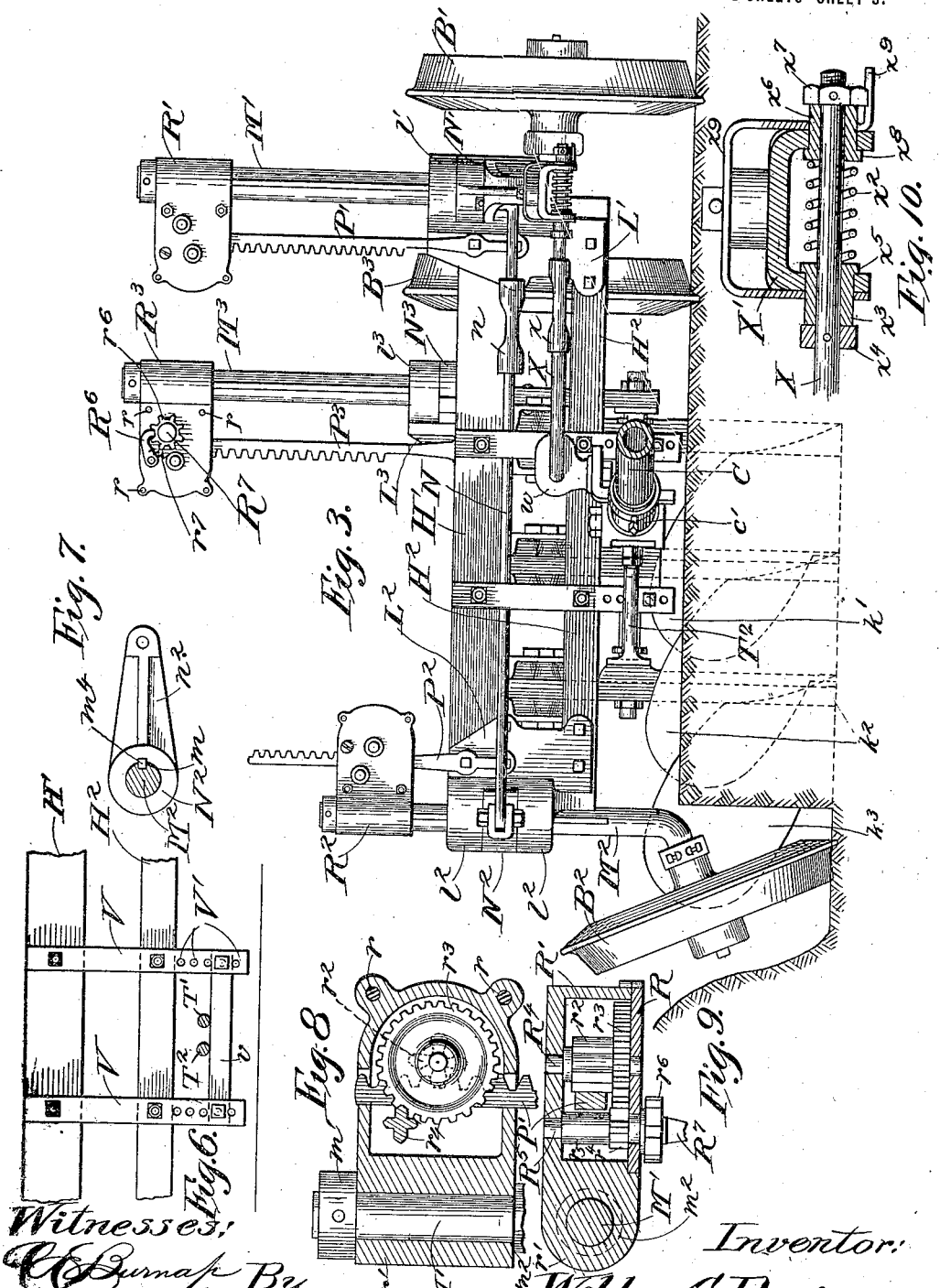

WELDEN C. RARIG, OF CORPUS CHRISTI, TEXAS.

COMBINATION STEERING MECHANISM FOR PLOWS.

1,335,529.  Specification of Letters Patent.  Patented Mar. 30, 1920.

Continuation of application Serial No. 743,252, filed January 21, 1913. This application filed June 18, 1914.
Serial No. 845,855.

*To all whom it may concern:*

Be it known that I, WELDEN C. RARIG, a citizen of the United States, residing at Corpus Christi, in the county of Nueces and State of Texas, have invented certain new and useful Improvements in Combination Steering Mechanism for Plows, of which the following is a specification.

My invention relates to a combination steering mechanism for plows or other earth working implements and this application is a continuation of my former application, Serial No. 743,252, filed January 21, 1913, upon which Patent No. 1,094,018 was granted.

As set forth in the above patent, when plowing hard ground or ground filled with obstructions which offer great resistance to the plow bodies, it is generally impossible to use a gang of plows having a combined width equal to the width of the traction engine, and in order that the engine may travel with both traction wheels on a hard unplowed surface, it is necessary that the plow traverse a path at one side of the path of the engine. To this end I have provided improved draft mechanism as described in said patent for connecting the engine to the plow when the latter is in a position disposed laterally from the path of said engine, and have provided in connection therewith, a combination steering mechanism for the plow which feature forms the subject-matter of the present application.

Among other features of my invention, I have provided supporting wheels for the plow which are vertically adjustable with respect to the frame of the plow so that the frame and the plow bodies carried thereby may be made to assume various positions relative to the wheels according to the depth of furrow desired and in combination with the above arrangement of adjustable elements, I have provided steering mechanism which is vertically immovable with respect to the plow frame and which at the same time operates to guide or steer the forward wheels of the plow irrespective of their position with respect to the plow frame. I have further arranged my steering mechanism to be actuated by or in connection with the draw-bar of the plow in such a manner as to automatically maintain the plow in the desired position at one side of the path of the engine regardless of the depth of furrow being plowed. In order that the guiding of the plow may be more effectually accomplished, I have provided an attachment for securing the draft bar to the plow frame which attaching means may be adjusted to secure the most effective operation of the steering mechanism with varying conditions of soil and depths of furrow. The draw bar is preferably connected to the plow frame rearwardly of the front end of said frame in order to minimize the tendency of the plow to adjust itself to changes in direction of movement of the engine or other propelling means. A further feature of my invention is the operative arrangement of the steering wheels with respect to the plow bodies whereby I am enabled to offset the tendency of the plow bodies to follow a sinuous path in a vertical plane when plowing rough or uneven ground.

These and other features of my invention will be set forth more particularly in the following specification taken in connection with the accompanying drawings, in which I have illustrated one embodiment of my invention.

In the drawings;

Figure 1 shows a top plan view of a plow embodying the features of my invention;

Fig. 2 shows a side elevation of the same, the plow being in operative position with respect to the surface of the ground;

Fig. 3 shows a front elevation of the same;

Fig. 4 is a section on the line 4—4 of Fig. 1 showing the attachment of the draw bar connecting rods;

Fig. 5 is a section along the line 5—5 of Fig. 2 looking in the direction of the arrows showing another view of certain parts illustrated in Fig. 4;

Fig. 6 is a detail front elevation of a hanger for the draw bar connecting rods;

Fig. 7 shows a detail view of a steering knuckle showing the connection of the same with the shaft of the steering wheel;

Fig. 8 shows a vertical section through a gear box carried by the shaft of the steering wheel showing certain parts in elevation;

Fig. 9 shows a horizontal section through the gear box illustrated in Fig. 8;

Fig. 10 is a detail view showing the resilient connection of the steering rod with a steering knuckle;

Fig. 11 is a vertical section through the rear end of the draw-bar, showing the inner draft member and sliding key in elevation; and Fig. 12 is a detail view showing the eye-bolt to which the steering rod is attached.

Like numerals and letters of reference are used to designate like parts and elements in the several figures of the drawings.

Referring to the drawings, the frame of my improved plow is shown as comprising three parallel longitudinal channel beams $A^1$, $A^2$, $A^3$ of graduated lengths terminating in different transverse planes. F indicates a removable longitudinal channel beam bent so as to form longitudinal portions $F^1$, $F^2$, $F^3$ lying parallel to and spaced from the rear ends of the fixed channel beams $A^1$, $A^2$ and $A^3$. $D^1$, $D^2$ and $D^3$ designate removable longitudinal channel beams which are located between the fixed longitudinal beams and the removable longitudinal bent beam and which have their horizontal flanges extending inwardly toward the outwardly extending horizontal flanges of the fixed longitudinal beams. Plow standards $K^1$, $K^2$ and $K^3$ extend upwardly between the longitudinal fixed beams $A^1$, $A^2$ and $A^3$ and the longitudinal removable beams $D^1$, $D^2$ and $D^3$ and are secured thereto by bolts $K^4$. The plow bodies carried by the plow standards $K^1$, $K^2$ and $K^3$ are designated as $k^1$, $k^2$ and $k^3$. Extending transversely across the top flanges of the channel beams $A^1$, $A^2$ and $A^3$, $D^1$, $D^2$, $D^3$ and F, are tying means $G^1$, $G^2$, $G^3$ and $G^4$ which are also preferably of channel cross section. A flat plate G underlies the lower horizontal flanges of the longitudinal beams. Extending transversely across the lower horizontal flanges of the longitudinal channel beams beneath the plate G and alining with the top transverse beams are tie plates $g^1$, $g^2$, $g^3$ and $g^4$.

The front ends of the longitudinal beams $A^1$, $A^2$, $A^3$ and $D^3$ extend between two front transverse angle beams $H^1$ and $H^2$, the latter beams having their vertical flanges extending upwardly from the horizontal flanges to which the longitudinal beams are secured. An additional longitudinal fixed beam $A^5$ is shown by dotted lines spaced from the longitudinal beam $A^1$ in order to illustrate the manner in which the frame may be extended to accommodate additional plow bodies at the rear of the plow body $k^1$.

Secured to the upwardly projecting vertical flanges of the front angle beams $H^1$ and $H^2$ are plates $L^1$ and $L^2$ having pairs of spaced horizontal lugs or ears $l^1$ and $l^2$, respectively, as shown more particularly in Fig. 3. Extending vertically through the spaced pairs of ears $l^1$ and $l^2$ are the vertical portions $M^1$ and $M^2$ of the axles of the front wheels $B^1$ and $B^2$. Interposed between the spaced ears $l^2$ is a steering knuckle $N^2$ through which the vertical portion of the axle $M^2$ passes, a vertical key-way $m$ being formed in the axle into which extends a key $m^4$ secured to and carried by the knuckle as shown in detail in Fig. 7. In this manner the axle may be adjusted vertically relatively to the knuckle, but is non-rotatably connected therewith.

$N^1$ designates a knuckle interposed between the ears $l^1$ of the plate $L^1$ through which extends the vertical portion of the axle $M^1$, a key and groove connection being interposed between the knuckle and axle such as above described in connection with the axle $M^2$ and knuckle $N^2$.

$L^3$ designates a bracket rigidly secured to the rear of the plow frame having laterally projecting spaced ears $l^3$ between which is located the knuckle $N^3$ through which extends the vertical portion of the rear axle $M^3$ of the rear wheel $B^3$, a groove and key connection being provided between the axle and knuckle.

A steering arm $n^3$ projects from the knuckle $N^3$ and is pivotally connected to a screw threaded rod $o^3$—as shown in Fig. 1—which extends through an eye $o$ on a plate O rigidly secured to the top horizontal flanges of the channel beams $A^1$ and F. Lock nuts $o^1$ and $o^2$ engage the rod $o^3$ on opposite sides of the eye $o$ so that the position of the rear steering wheel $B^2$ may be adjusted with respect to a vertical axis.

Steering arms $n^1$ and $n^2$ project forwardly from the knuckles $N^1$ and $N^2$ respectively, these steering arms being pivotally connected by a rod N, the latter being adjustable in length by means of a turn buckle $n$ so as to adjust the relative positions of the front wheels $B^1$ and $B^2$. It will be apparent that by the above connection the forward steering wheels $B^1$ and $B^2$ may be made to move in unison about vertical axes.

Rigidly secured to the brackets $L^1$ and $L^2$ at the forward end of the plow frame are vertically extending rack bars $P^1$ and $P^2$, respectively. A similar rack bar $P^3$ projects upwardly adjacent the rear axle $M^3$ and is rigidly secured at its lower end to a bracket $L^4$ which is secured to the plow frame, as shown more particularly in Fig. 2. The rack bars $P^1$, $P^2$ and $P^3$ extend through gear casings $R^1$, $R^2$ and $R^3$, respectively, through which also extend the vertical portions of the axles $M^1$, $M^2$ and $M^3$ respectively, said axle portions being rotatable with respect to said gear casings. The gear casings and gears therein are all similar and are illustrated more particularly in Figs. 3, 8 and 9. In the latter two figures are shown the gear casing and inclosed gears for relatively adjusting the axle $M^1$ with respect to the plow frame. R indicates the removable side cover of each gear box which is secured in place by screws $r$ fastened through registering lugs on the casing and cover. $R^4$ designates a stub shaft journaled at its ends in the casing and cover and having rigidly secured thereon a pinion $r^2$ and a gear wheel $r^3$, the latter meshing with a pinion $r^4$ fixed upon a counter shaft $R^5$ extending through and journaled in the cover R and opposing wall of the casing. The vertical rack bar $P^1$ extends between the pinion $r^2$ with which it meshes and a cylindrical bearing $r^5$ on the shaft $R^5$, the rack bar being thereby retained in mesh with the pinion $r^2$. The shaft $R^5$ has secured thereto a ratchet $r^6$ on the portion thereof outside of the cover of the gear casing. A pawl $R^6$ coöperates with the ratchet $r^6$ to lock the same and with it the rack bar P in any desired adjusted position. $r^7$ is a spring for retaining the pawl $R^6$ in engagement with the ratchet wheel $r^6$. The end of the shaft $R^5$ is squared, as shown at $R^7$ so as to be engaged by a wrench for rotating the same.

In order to raise or lower any of the wheels with respect to the plow frame, a wrench is applied to $R^7$ and the respective shaft $R^5$ thereby rotated, which through the meshed pinion $r^4$ and gear $r^3$ raises or lowers the corresponding rack bar through the engagement therewith of the pinion $r^2$ thereby vertically adjusting such rack bar with respect to the gear casing and at the same time vertically adjusting the corresponding axle with respect to the plow frame. In this manner each of the wheels may be raised or lowered to assume the desired position with respect to the plow frame. The gear casing is prevented from moving vertically relatively to the axle by means of a shoulder $m^2$ formed by reducing the upper end of the axle which passes through the gear casing, and by a collar $m^1$ clamped to the upper end of the axle immediately above the gear casing.

The draw bar which operatively connects the plow with the traction engine or other propelling means, is connected with the plow frame by means of a draw bar connecting mechanism comprising two draw bar connecting rods $T^1$ and $T^2$. These rods $T^1$ and $T^2$ extend beneath the plow frame and diverge rearwardly from the front cross members $H^1$ and $H^2$ and have rearwardly bent flat portions each provided with a plurality of apertures $T^3$ therethrough by means of which a connection is made with the plow frame at two points on opposite sides of the center line of said frame. For the purpose of making the connection above referred to the longitudinal fixed beam $A^1$ is provided with a depending plate $t^1$ which is riveted or otherwise secured to the vertical web of said longitudinal beam at a point substantially opposite the plow standard $K^3$. The depending plate $t^1$ and oppositely disposed plow standard $K^3$ are suitably apertured to be engaged by a transverse fixed tie-rod $t$ which engages any suitable pair of apertures $T^3$ in the draw bar connecting rods $T^1$ and $T^2$ and is secured in fixed position by nuts $t^2$ or other suitable fastening means. In order to provide a certain flexibility in the attachment of the draw bar connecting rods to the plow frame the tie-rod $t$ is provided at each end adjacent the inner faces of the depending plate $t^1$ and plow standard $K^3$, with collars $s$ having a length greater than the thickness of said draw bar connecting rods. At their inner ends these collars abut against washers $s^1$ which have a diameter greater than the diameter of the collars $s$ and which are spaced apart and held in fixed position with respect to the tie rod $t$ by means of a spacing sleeve S. It will be seen that the draw bar connecting rods $T^1$ and $T^2$ are free to slide upon the collars $s$ between the washers $s^1$ and the adjacent faces of the plate $t^1$ and plow standard $K^3$.

Adjacent the front transverse angle beams $H^1$ and $H^2$ the forwardly converging rods $T^1$ and $T^2$ are supported by a transverse bar $v$ which is detachably secured at its ends to the depending hanger plates V. The plates V are secured to the transverse beams $H^1$ and $H^2$ and their lower depending portions are provided with a plurality of apertures $V^1$ which permit the adjustment of the bar $v$ to assume various positions with respect to the beams $H^1$ and $H^2$. By the construction above described an adjustable hanger is provided which permits a transverse movement of the forward ends of the draw bar connecting rods to correspond to the lateral motion of the rear ends of said rods on the collars $s$. By adjusting the rear ends of the tie rods in combination with different positions of the transverse bar $v$ I am able to apply the draft on the plow frame in the manner most suitable for the soil being plowed. In order that the desired inclination of the draw bar connecting rods with respect to the frame may be secured with greater accuracy, a turnbuckle $T^4$ is provided in connection with one of said connecting rods.

Forwardly of the hanger plate V the draw bar connecting rods $T^1$ and $T^2$ are bent forwardly to form parallel extremities which are adapted to form a pivotal connection with the corresponding parallel flanges of a clevis U. The clevis U is connected by means of a vertically extending pivot with the draw bar socket W which is adapted to receive and form a rigid connection with the draw bar member $C^1$. The member $C^1$ is of sleeve form and is adapted to receive the draw bar C which has rigidly secured thereto, by means of the pin $c^1$, the key $c$ which is adapted to slide in the slots $c^2$ in said member. The forward position of the key $c$ in the slots $c^2$ may be limited in degree by the detachable collar $C^2$ which may be secured to the sleeve $C^1$ by studs $c^3$ engaging any suitable pair of threaded holes $c^4$ in said member. The key $c$ is provided with a transverse head, which carries on its upper side a pivotally mounted eye bolt $w$ having a plurality of apertures $w^1$ in the head thereof, any one of which is adapted to be engaged by the hooked extremity of a steering rod X which operatively connects the draft mechanism with the steering arm $n^1$. The length of the steering rod X may be adjusted by means of the turn buckle $x$ and its outer extremity is resiliently connected to the steering arm $m^1$ by means of the following construction:

The forward extremity of the steering arm $n^1$ has rigidly connected thereto a bolt $x^1$ which carries a yoke $X^1$ within which is located a spring $x^2$ surrounding the portion of the steering rod X which passes through said yoke. A collar $x^3$ is mounted to the steering rod X adjacent the inner end of the yoke, said collar having the up-set end $x^5$ within the yoke and abutting against the end of the coil spring $x^2$. A collar $x^4$ is secured to the steering rod on the inner side of the yoke in contact with the collar $x^3$. At its outer end the steering rod carries another collar $x^6$ which is slidably mounted thereon and retained in position on said steering rod by means of the nut $x^7$ which threadedly engages the extremity thereof. The collar $x^6$ is provided with the inner up-set end $x^8$ within the yoke $X^1$. The nut $x^7$ may be retained in position on the steering rod by means of a spring $x^9$ or other suitable means.

It will be apparent that by this construction a connection is made which will permit a relative movement of the steering rod X with respect to the steering arm $n^1$, the fixed collar $x^3$ sliding within the yoke $X^1$ and compressing the spring $x^2$ against the opposite collar $x^6$, it being understood that at the same time the steering rod X slides outwardly with respect to the collar $x^6$.

Having described the construction of one embodiment of my invention, I will now set forth some of the advantages thereof in connection with the operation of the same. From the description it will be evident that the steering knuckles with their corresponding steering arms and the rods N and X are secured against vertical movement with respect to the frame of the plow and it has also been made clear that each of the supporting wheels $B^1$, $B^2$ and $B^3$ is vertically and independently adjustable with respect to the plow frame and the plow bodies carried thereby. This construction enables the operator to adjust the wheels in a manner to secure the desired depth of furrow at the same time maintaining the plane of the plow frame in the most advantageous position with respect to the surface of the ground. It is to be noted that when such adjustment is made, the steering arms and associated steering mechanism do not change their relative positions with respect to the frame and do not in any way interfere with obstacles which lie beneath and in the path of the plow.

From the inclination of the draw bar, shown most clearly in Fig. 1, it will be understood that the engine or other propelling means is adapted to travel in a path at one side of the longitudinal axis of the plow or at one side of the path of travel of the plow, and it will further be apparent that the engine's path is located on that side of the path of the plow on which the connection is made between the steering arm $n^1$ and the draw bar. By this construction I am enabled to maintain the path of the plow at one side of the path of the engine in order that the engine may travel at all times on a hard, unplowed surface. The maintenance of this relative position of the engine and plow is due to the fact that the tendency of the plow to aline longitudinally with the engine operates in each instance to direct the forward peripheries of the front steering wheels toward the furrow which was plowed on the next preceding trip across the field, it being understood, of course, that this furrow is at the right of the plow, as viewed in Fig. 1. As previously set forth, when the engine is moving forwardly the plow will tend to move toward a position directly behind the engine. As soon as this movement begins the draw bar C will assume a position more nearly coinciding with the longitudinal axis of the plow, thereby pulling both of the steering arms $N^1$ and $N^2$ to the right, as viewed in Fig. 1, thereby directing the wheels $B^1$ and $B^2$ toward the furrow and offsetting the tendency of the plow to move inwardly toward the path of the engine. When the engine is backed the natural tendency of the plow will be to move outwardly at its forward end away from the path of the engine, but as soon as the engine exerts a backward thrust on the draw bar the member C will slide within the member $C^1$ and the key $c$ will move rearwardly in the slots $c^2$, thereby directing the forward portions of the peripheries of the steering wheels toward the right, as viewed in Fig. 1, and steering the plow toward a position behind the engine, as opposed to the tendency of the plow to move toward a position with its axis at right angles to the path of the engine. It will be seen that when the key $c$ is in its normal forward position, the steering arm X is substantially at right angles to the axis of the draw bar so that a movement of the key rearwardly in the slots $c^2$ will direct the steering knuckles $n^1$ and $n^2$ to the right as viewed in Fig. 1. By changing the position of the collar $C^2$, the forward position of the key $c$ can be limited as desired. The plow may be further adjusted to follow the path desired by inclining the rear wheel $B^3$ about its vertical axis so as to tend to overcome any natural tendency which the plow may have when passing over a particular piece of ground to move in a course other than that desired.

I further overcome the tendency of the plow to follow an irregular path or to adjust itself to momentary changes of direction of travel of the engine or propelling means by attaching the draw bar connecting means to the frame at two points beneath and rearwardly of the front cross members of the plow frame. By this construction the draft is applied to the plow more nearly the center thereof and sufficiently far removed from the forward end of the plow frame to largely overcome any influences tending to give the plow a constantly changing direction of movement by virtue of the draft applied thereto. It is well known that some soils plow differently than others and therefore the plow is at different times subjected to varying influences tending to direct it from its normal path at one side of the engine. In order that the draft on the plow may be adjusted in direction so as to secure the best possible results under different circumstances, I have made the draw bar connecting means adjustable with respect to the plow frame. From the construction described, it will be evident that the draw bar connecting rods $T^1$ and $T^2$ may be given various horizontal and vertical inclinations with respect to the plow frame by combining the adjustments made possible by the hanger plates V with the adjustments made possible by the connection of the draw bar connecting members $T^1$ and $T^2$ at the rear ends of said members. In order that the effective length of the steering rod X may be adjusted to correspond with various adjustments of the draw bar connecting rods $T^1$ and $T^2$, I have provided a plurality of apertures $w^1$ in the eye bolt $w$ and I have further provided a turn buckle $x$ whereby finer adjustments in length may be made. The resilient connection of the steering rod X with the steering arm $n^1$ operates to permit a certain flexibility of the parts of the steering mechanism in case either of the forward wheels $B^1$ or $B^2$ suddenly encounters an obstruction in its path.

From an inspection of Fig. 1 it will be clear that the wheels $B^2$ and $B^3$ are substantially on a line with the plow bodies $k^1$, $k^2$ and $k^3$, so that when the plow is passing over rough or uneven ground the effect of the wheel $B^1$ passing over obstructions or into depressions will be to merely oscillate the plow frame and steering mechanism about a line extending between the wheels $B^2$ and $B^3$, thus preventing the plow bodies from plowing a deeper or more shallow furrow at different points longitudinally of the path of the plow. In connection with the plowing of rough or uneven ground, the tendency of the plow to leave its predetermined path because of an uneven or up and down movement of the forward end thereof, is corrected by virtue of the fact that the steering mechanism lies in substantially the same horizontal plane as the plow frame so that if, for instance, the wheel $B^1$ drops into a depression or passes over an obstruction, the distance between the forward end of the steering arm $n^1$ and the eye bolt $w$ will tend to become greater and the steering rod X will thereupon operate to direct both of the wheels $B^1$ and $B^2$ toward the furrow.

In the foregoing specification I have set forth the construction of a specific embodiment of my invention and have explained some of the advantages of this construction in connection with the operation of the plow when propelled by a traction engine at one side of the path of such engine. It will be understood, however, that implements embodying my invention may be operated in other ways and by other means than those suggested or described herein and that my improved plow may be constructed in many different forms without departing from the spirit of my invention, and I do not, therefore, wish to be limited in the scope of my invention except as defined by the appended claims.

I claim:—

1. In a plow adapted to be drawn by a propelling means, the combination with a supporting frame of a supporting wheel upon which said frame is mounted, means for adjusting said wheel vertically with respect to said frame, a steering knuckle connected to said wheel for oscillating the same about a vertical axis, and means for positively preventing vertical movement of said steering knuckle when said wheel is adjusted vertically with respect to said frame.

2. In a plow adapted to be drawn by a propelling means, the combination with a substantially triangular frame carrying plow bodies, of three supporting wheels upon which said frame is mounted, axles by which said wheels are carried, brackets secured to the forward end of said frame at opposite sides thereof, and at the rear end thereof, said axles having vertically extending parts rotatably and slidably mounted in said brackets, steering knuckles non-rotatably mounted on said axles and secured against vertical movement with respect to said brackets, means for adjusting said axles vertically in said brackets and in said steering knuckles, a draw bar connected to the forward end of said frame, and means connecting said steering knuckles at the forward end of said frame to said draw bar.

3. In a plow adapted to be drawn by a propelling means, the combination with a supporting frame carrying plow bodies of wheels on which said frame is mounted, steering mechanism for oscillating the wheels at the forward end of said frame about vertical axes, means for adjusting said wheels vertically with respect to said supporting frame, and means for preventing vertical movement of said steering mechanism by the vertical adjustment of said wheels.

4. In a plow adapted to be drawn by propelling means, the combination with a supporting frame carrying plow bodies of wheels on which said frame is mounted, means for vertically adjusting all of said wheels relatively to said frame and independently of each other, steering mechanism for oscillating the steering wheels about vertical axes, and means for positively preventing vertical movement of the parts of said steering mechanism with respect to said frame upon vertical adjustment of a wheel operated by said steering mechanism.

5. In a plow adapted to be drawn by propelling means, the combination with a supporting frame carrying plow bodies of a steering wheel upon which said frame is mounted, a vertically extending axle carrying said wheel and rotatably and slidably mounted in said frame, a steering knuckle having a non-rotative engagement with the vertical portion of said axle, means for adjusting said axle vertically with respect to said frame, means for preventing vertical movement of said steering knuckle by engagement with the upper side thereof upon vertical adjustment of said axle, and means connected to said steering knuckle for oscillating said wheel about a vertical axis.

6. In a plow adapted to be drawn by a propelling means at one side of the path of the propelling means, the combination with a supporting frame carrying plow bodies of wheels upon which said frame is mounted, means for vertically adjusting said wheels relatively to the supporting frame independently of each other, steering mechanism for oscillating the steering wheels about vertical axes, means for preventing vertical movement of parts of said steering mechanism upon vertical adjustment of a steering wheel, a draw-bar connected to said frame, and means connecting said draw-bar with said steering mechanism on the side of the draw-bar adjacent the path of the propelling means.

7. In a plow adapted to be drawn by a propelling means in a path parallel to the path of the propelling means, the combination with a supporting frame carrying plow bodies, of wheels on which said frame is mounted, means for vertically adjusting the wheels relatively to the supporting frame, steering mechanism supported by said frame for oscillating the steering wheels about vertical axes, and draw-bar mechanism connected to said frame, said steering mechanism being connected to said draw-bar mechanism on the side of the latter toward the longitudinal center line of said propelling means.

8. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatably engaging the axles and through which the axles are vertically adjustable, said knuckle being secured against vertical movement with respect to the supporting frame, a rod connecting the knuckles of the front wheels, draw-bar mechanism connected to said frame, and a steering rod connecting one of the front knuckles with said draw-bar mechanism.

9. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatively engaging the axles and having said axles adjustable vertically therethrough, means for securing said knuckles against vertical movement with respect to said frame, means connecting the knuckles of the front wheels, a draw bar, means connected to said draw bar and adjustably connected to the lower part of said frame rearwardly of the forward end thereof, and a steering rod connecting one of the said knuckles with said draw bar.

10. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatably engaging the axles and through which the axles are vertically adjustable, means for securing said knuckles against vertical movement with respect to the supporting frame, a rod connecting the knuckles of the front wheels, draw-bar mechanism connected to said frame, a steering rod connecting one of the front knuckles with said draw-bar mechanism, and means to adjust the length of said steering rod.

11. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatably engaging the axles and having the axles adjustable vertically therethrough, means for securing said knuckles against vertical movement with respect to said frame, a draw bar connected to said frame, said draw bar comprising telescoping parts, means connecting the knuckles of the front wheels, and means to connect the forward portion of said draw bar with one of said front knuckles, whereby a rearward movement of the forward portion of said draw bar will move the knuckle to which said draw bar is directly connected toward said draw bar.

12. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatably engaging the axles and through which the axles are vertically adjustable, means for securing said knuckles against vertical movement with respect to the supporting frame, a rod connecting the knuckles of the front wheels, draw-bar mechanism connected to said frame, and a steering rod connecting one of the front knuckles with said draw-bar mechanism, said steering rod being resiliently connected to said steering knuckle.

13. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatably engaging the axles and through which the axles are vertically adjustable, means for securing said knuckles against vertical movement with respect to the supporting frame, a rod connecting the knuckles of the front wheels, draw-bar mechanism connected to the underside of said frame rearwardly of its forward end, a steering rod connecting one of the front knuckles with said draw-bar mechanism, and means to adjust said draw-bar mechanism with respect to said frame.

14. In a plow adapted to be drawn by a propelling means, the combination with a supporting frame carrying plow bodies, of wheels upon which said frame is mounted, axles for said wheels having oscillatory vertical portions, means for raising and lowering said axles relatively to the supporting frame, steering knuckles non-rotatably engaging the axles and through which the axles are vertically adjustable, means for securing said knuckles against vertical movement with respect to the supporting frame, a rod connecting the knuckles of the front wheels, draw-bar mechanism connected to said frame, a steering rod connecting one of the front knuckles with said draw-bar mechanism, means to adjust said draw-bar mechanism horizontally and vertically with respect to said frame, and means to vary the point of attachment of said steering rod on said draw-bar mechanism.

15. In a plow adapted to be drawn by propelling means, the combination with a supporting frame carrying plow bodies of wheels upon which said frame is mounted, means for vertically adjusting said wheels with respect to said frame, steering mechanism for oscillating the steering wheels about vertical axes, means for preventing vertical movement of said steering mechanism upon vertical adjustment of said steering wheels, a draw-bar to which said steering mechanism is connected, means to connect said draw-bar to said frame, means to adjust the inclination of said connecting means with respect to said frame, and means to adjust the relation of said steering mechanism with respect to said draw-bar.

In testimony whereof, I have subscribed my name.

WELDEN C. RARIG.

Witnesses:
GLEN E. SMITH,
HENRY A. PARKS.